US012795239B2

(12) United States Patent
Chen et al.

(10) Patent No.: US 12,795,239 B2
(45) Date of Patent: Nov. 10, 2026

(54) ANTI-SHAKE ASSEMBLY, CAMERA MODULE, AND ELECTRONIC DEVICE

(71) Applicant: GUANGDONG OPPO MOBILE TELECOMMUNICATIONS CORP., LTD., Dongguan (CN)

(72) Inventors: Wei Chen, Dongguan (CN); Guofang Xiong, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/779,967

(22) Filed: Jul. 22, 2024

(65) Prior Publication Data

US 2024/0380977 A1 Nov. 14, 2024

Related U.S. Application Data

(63) Continuation of application No. PCT/CN2022/138113, filed on Dec. 9, 2022.

(30) Foreign Application Priority Data

Jan. 25, 2022 (CN) ......................... 202210088055.7

(51) Int. Cl.
*H04N 23/68* (2023.01)
*G03B 5/02* (2021.01)
(Continued)

(52) U.S. Cl.
CPC ............. *H04N 23/687* (2023.01); *G03B 5/02* (2013.01); *G03B 30/00* (2021.01); *H04N 23/54* (2023.01);
(Continued)

(58) Field of Classification Search
None
See application file for complete search history.

(56) References Cited

U.S. PATENT DOCUMENTS 7,881,598 B1 2/2011 Wu et al.
2015/0229843 A1 8/2015 Shimizu
(Continued)

FOREIGN PATENT DOCUMENTS

CN 108072958 A 5/2018
CN 209201203 U 8/2019
(Continued)

OTHER PUBLICATIONS

European Search Report, European Application No. 22923510.6, mailed Feb. 11, 2025 (11 pages).
(Continued)

*Primary Examiner* — Paul M Berardesca
(74) *Attorney, Agent, or Firm* — Ladas & Parry LLP

(57) ABSTRACT

An anti-shake assembly, a camera module, and an electronic device. The anti-shake assembly includes a bearing plate and a driving mechanism. The bearing plate includes a movable member and a fixed member, and the movable member is used for bearing an image sensor of the camera module. The driving mechanism includes a moving member and a plurality of deformable members, and the moving member is connected to the movable member. An end of each of the deformable members is connected to the fixed member, another end of each of the deformable members is connected to the moving member, and the plurality of deformable members are configured to be deformed in a power-on state to drive the moving member, the movable member, and the image sensor to move.

18 Claims, 5 Drawing Sheets

(51) Int. Cl.

| | |
|---|---|
| ***G03B 30/00*** | (2021.01) |
| ***H04N 23/54*** | (2023.01) |
| ***H04N 23/57*** | (2023.01) |
| *G03B 3/10* | (2021.01) |

(52) U.S. Cl.

CPC ............... *H04N 23/57* (2023.01); *G03B 3/10* (2013.01); *G03B 2205/0038* (2013.01); *G03B 2205/0076* (2013.01)

(56) References Cited

U.S. PATENT DOCUMENTS

| | | | | |
|---|---|---|---|---|
| 2017/0289455 | A1* | 10/2017 | Hu | H04N 23/57 |
| 2020/0174274 | A1* | 6/2020 | Wang | G02B 27/646 |
| 2025/0362562 | A1* | 11/2025 | Xiao | G03B 5/00 |

FOREIGN PATENT DOCUMENTS

| | | | | | |
|---|---|---|---|---|---|
| CN | 110784650 | A | | 2/2020 | |
| CN | 111556239 | A | | 8/2020 | |
| CN | 112073600 | A | | 12/2020 | |
| CN | 112672028 | A | | 4/2021 | |
| CN | 112799202 | A | | 5/2021 | |
| CN | 112887521 | A | | 6/2021 | |
| CN | 112911107 | A | | 6/2021 | |
| CN | 113489886 | A | | 10/2021 | |
| CN | 113489888 | A | | 10/2021 | |
| CN | 113497862 | A | | 10/2021 | |
| CN | 113640999 | A | | 11/2021 | |
| CN | 113727007 | A | | 11/2021 | |
| CN | 113840060 | A | | 12/2021 | |
| CN | 114422700 | A | | 4/2022 | |
| CN | 216531554 | U | * | 5/2022 | |
| WO | 2018112436 | A1 | | 6/2018 | |
| WO | 2020233418 | A1 | | 11/2020 | |
| WO | WO-2024082845 | A1 | * | 4/2024 | H04N 23/55 |

OTHER PUBLICATIONS

Chinese First Office Action, Chinese Application No. 202210088055.7, mailed Jul. 21, 2023 (13 pages).

International Search Report and Written Opinion, International Application No. PCT/CN2022/138113, mailed Feb. 22, 2023 (13 pages).

European Examination Report, European Application No. 22923510.6, mailed Feb. 2, 2026 (7 pages).

First Office Action, India Patent Application No. 202417059682, mailed Aug. 17, 2026 (7 pages).

* cited by examiner

ANTI-SHAKE ASSEMBLY, CAMERA MODULE, AND ELECTRONIC DEVICE

CROSS REFERENCE TO RELATED APPLICATIONS

The present disclosure is a continuation-application of International (PCT) Patent Application No. PCT/CN2022/138113 filed on Dec. 9, 2022, which claims priority to Chinese patent application No. 202210088055.7 filed on Jan. 25, 2022, the entire contents of which are incorporated herein by reference.

TECHNICAL FIELD

The present disclosure relates to the field of electronic technologies, and in particular to an anti-shake assembly, a camera module, and an electronic device.

BACKGROUND

Electronic device, with an increasing popularity, has become an indispensable social tool and entertainment tool in people's daily life. People's requirements for electronic devices are getting higher and higher.

SUMMARY

In a first aspect, the present disclosure provides an anti-shake assembly including a bearing plate and a driving mechanism. The bearing plate includes a movable member and a fixed member arranged with an interval therebetween, and the movable member is configured to bear an image sensor of a camera module. The driving mechanism is arranged at a side of the bearing plate, the driving mechanism includes a moving member and a plurality of deformable members, the moving member is connected to the movable member, an end of each of the deformable members is connected to the fixed member, another end of each of the deformable members is connected to the moving member, and the deformable members are configured to be deformed in a power-on state for driving the moving member, the movable member, and the image sensor to move.

In a second aspect, the present disclosure provides a camera module including a lens, an image sensor, and an anti-shake assembly. The lens is configured to collect external light. The image sensor is disposed opposite to the lens along a direction of an optical axis of the lens. The anti-shake assembly includes a bearing plate and a driving mechanism, the bearing plate includes a movable member and a fixed member arranged with an interval therebetween, the movable member is configured to bear an image sensor of a camera module, the driving mechanism is arranged at a side of the bearing plate, the driving mechanism includes a moving member and a plurality of deformable members, the moving member is connected to the movable member, an end of each of the deformable members is connected to the fixed member, another end of each of the deformable members is connected to the moving member, and the deformable members are configured to be deformed in a power-on state for driving the moving member, the movable member, and the image sensor to move.

In a third aspect, the present disclosure provides an electronic device including a shell and a camera module arranged in the shell. The camera module includes a lens, an image sensor, and an anti-shake assembly. The lens is configured to collect external light. The image sensor is disposed opposite to the lens along a direction of an optical axis of the lens. The anti-shake assembly includes a bearing plate and a driving mechanism, the bearing plate includes a movable member and a fixed member arranged with an interval therebetween, the movable member is configured to bear an image sensor of a camera module, the driving mechanism is arranged at a side of the bearing plate, the driving mechanism includes a moving member and a plurality of deformable members, the moving member is connected to the movable member, an end of each of the deformable members is connected to the fixed member, another end of each of the deformable members is connected to the moving member, and the deformable members are configured to be deformed in a power-on state for driving the moving member, the movable member, and the image sensor to move.

BRIEF DESCRIPTION OF THE DRAWINGS

In order to more clearly illustrate the technical solutions in the embodiments of the present disclosure, the drawings needed to be used in the description of the embodiments are briefly introduced below. Obviously, the drawings in the following description are merely a part of the embodiments of the present disclosure, and those skilled in the art may also obtain other drawings according to these drawings without creative work.

DETAILED DESCRIPTION

The technical solutions in the embodiments of the present disclosure are clearly and thoroughly described below in conjunction with FIG. 1 to FIG. 10 in the embodiments of the present disclosure. Obviously, the embodiments described are merely a part of the embodiments, rather than all the embodiments. Based on the embodiments of the present disclosure, all other embodiments obtained by those skilled in the art without creative work fall within the scope of protection of the present disclosure.

The embodiments of the present disclosure provide a camera module 10 configured to realize functions of electronic device, such as photographing, video recording, face recognition unlocking, code scanning payment, and etc. In addition, it should be noted that the camera module 10 may be a front camera or a rear camera, which is not limited in the embodiments. The structure of the camera module 10 are described in detail below with reference to the accompanying drawings.

Figure 1:
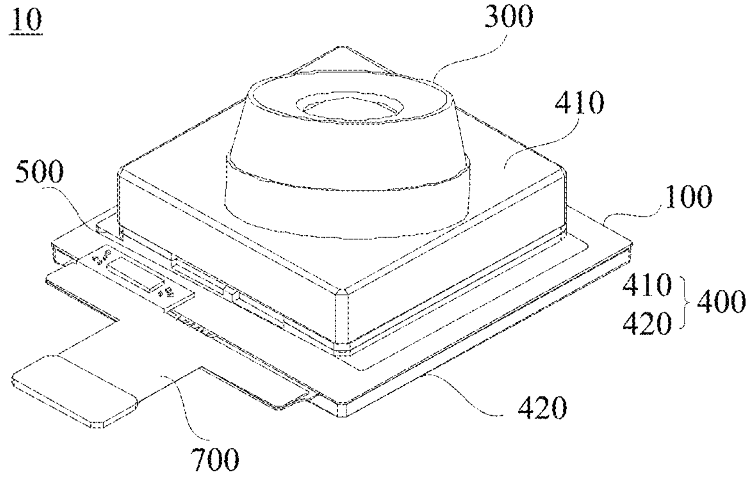
FIG. 1 is a schematic structure diagram of a camera module according to some embodiments of the present disclosure.
Figure 2:
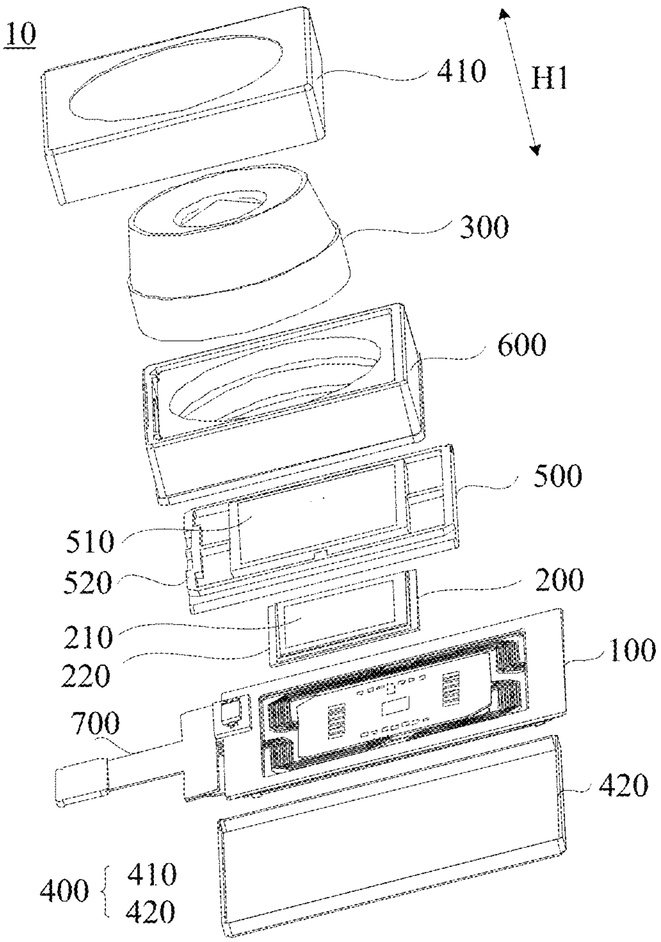
FIG. 2 is a schematic exploded diagram of the camera module shown in FIG. 1 according to some embodiments of the present disclosure.

As shown in FIG. 1 and FIG. 2, FIG. 1 is a schematic structure diagram of a camera module according to some embodiments of the present disclosure, and FIG. 2 is a schematic exploded diagram of the camera module shown in FIG. 1 according to some embodiments of the present disclosure. The camera module 10 at least includes an anti-shake assembly 100, an image sensor assembly 200, a lens 300 and a housing 400.

The housing 400 may include an top cover 410 and a bottom cover 420. The top cover 410 and the bottom cover 420 may form an accommodating space. At least portion of the image sensor assembly 200 and at least portion of the anti-shake assembly 100 may be disposed in the accommodating space. A portion of the lens 300 may be disposed in the accommodating space, another portion of the lens 300 may protrude out of the accommodating space. In some embodiments, as shown in FIG. 1 and FIG. 2, an area of the bottom cover 420 may be larger than an area of the top cover 410, such that the bottom cover 420 are enabled to be used as a bottom plate of the camera module 10, and the camera module 10 may be connected to the electronic device. In some embodiments, the area of the bottom cover 420 may also be substantially equal to or smaller than the area of the top cover 410, which is not limited in the embodiments of the present disclosure.

Material of the lens 300 may be glass or plastic. The lens 300 may be provided with multiple layers of lenses. The lens 300 may collect external light, change a propagation path of the light, and focus the light. As shown in FIG. 2, the camera module 10 may also include a filter assembly 500 arranged between the lens 300 and the image sensor assembly 200 along a direction of an optical axis of the lens 300. The filter assembly 500 may include one or more layers of filters 510 and a filter holder 520 bearing the filters 510. Multiple layers of filters 510 may correct the filtered light with each other, such that the multiple layers of filters 510 are enabled to filter stray light (e.g., infrared light) layer by layer when the light passes through the lens 300, thereby increasing imaging effect of the camera module 10.

The image sensor assembly 200 may be arranged opposite to the lens 300 along the direction of the optical axis of the lens 300. The image sensor assembly 200 may include an image sensor 210 and an image sensor circuit board 220. The lens 300, the image sensor 210, and the image sensor circuit board 220 may be arranged in a stack along a first direction H1. The first direction H1 may be a thickness direction of the camera module 10. The lens 300 and the image sensor 210 may be parallel to each other. The image sensor 210 may be, but not limited to, a charge coupled device (CCD), complementary metal oxide semiconductor (CMOS), and other types of image sensors. The image sensor 210 is mainly configured to receive the light collected by the lens 300 and convert a light signal into an electrical signal, so as to facilitate an imaging of the camera module 10. The image sensor circuit board 220 may bear the image sensor 210, and be electrically connected to the image sensor 210 to supply power and send a control signal to the image sensor 210.

The anti-shake assembly 100 may be arranged at a side of the image sensor 210 away from the lens 300 along the direction of the optical axis of the lens 300. The anti-shake assembly 100 may be connected to the image sensor 210 for driving the image sensor 210 to move. The anti-shake assembly 100 may be configured to improve the imaging effect of the camera module 10 caused by shaking of the user during use, such that the imaging effect of the image sensor 210 is enabled to meet the user's requirements. The anti-shake assembly 100 may provide a driving force for driving the image sensor 210 to move.

Based on optical anti-shake technologies, sensors such as gyroscopes or accelerometers of the electronic device (or camera module 10) may detect the shake of the lens 300 to generate a shake signal, and transmit the shake signal to a processing chip of the electronic device and/or the camera module 10. The processing chip of the electronic device and/or the camera module 10 may calculate an amount of displacement that the anti-shake assembly 100 needs to compensate, such that the anti-shake assembly 100 is enabled to compensate the lens 300 based on a shaking direction and the amount of displacement of the lens 300, thereby improving the imaging effect of the camera module 10 caused by shaking of the user during use.

Figure 3:
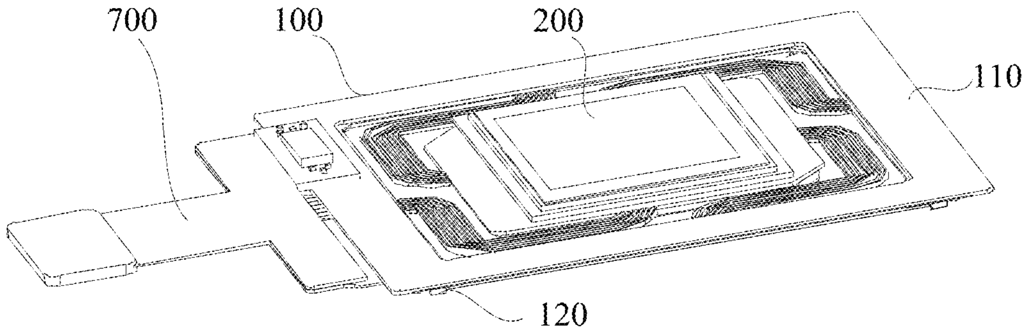
FIG. 3 is a schematic connection diagram of an anti-shake assembly and an image sensor assembly shown in FIG. 2 according to some embodiments of the present disclosure.
Figure 4:
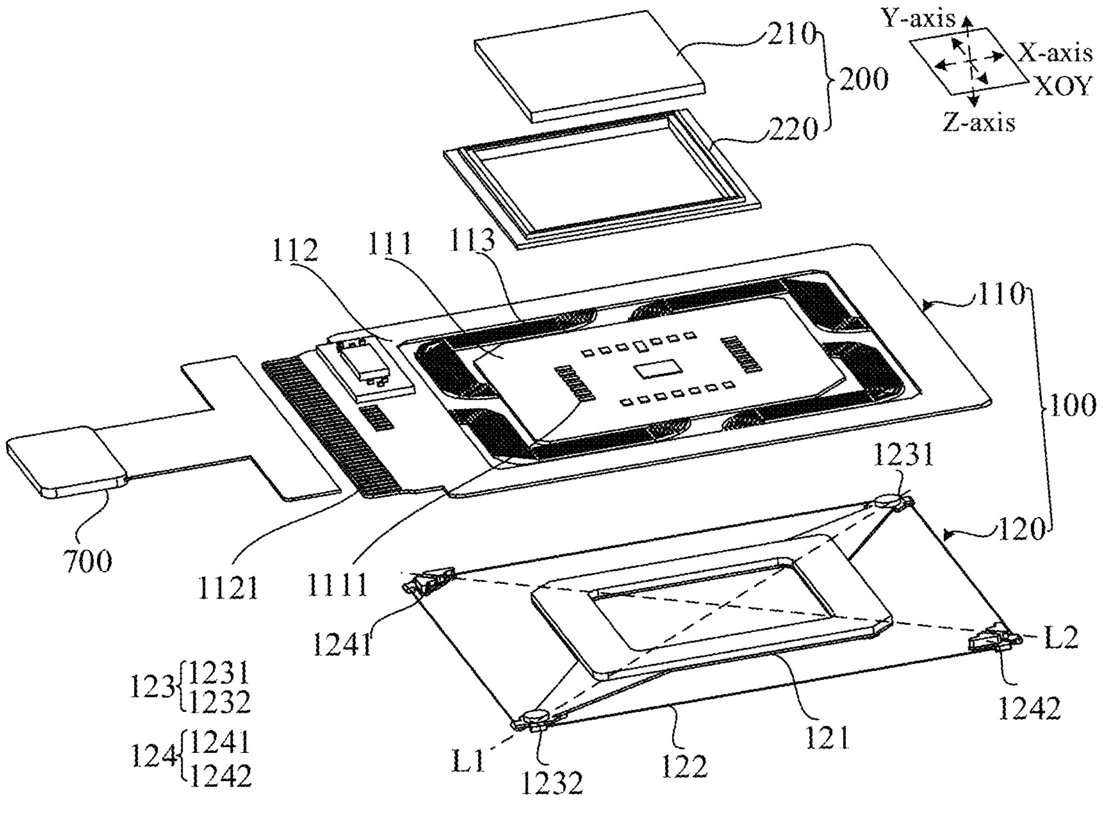
FIG. 4 is a schematic exploded diagram of the anti-shake assembly and the image sensor assembly shown in FIG. 3 according to some embodiments of the present disclosure.

As shown in FIG. 2 to FIG. 4, FIG. 3 is a schematic connection diagram of an anti-shake assembly and an image sensor assembly shown in FIG. 2 according to some embodiments of the present disclosure, FIG. 4 is a schematic exploded diagram of the anti-shake assembly and the image sensor assembly shown in FIG. 3 according to some embodiments of the present disclosure. The anti-shake assembly 100 may include a bearing plate 110 and a driving mechanism 120.

The bearing plate 110 may used as a circuit board of the image sensor 210 and bear the image sensor 210. The bearing plate 110 may include a movable member 111 and a fixed member 112 arranged with an interval therebetween. The fixed member 112 of the bearing plate 110 may be connected to and fixed with the camera module 10, the electronic device, or other structural assemblies. The movable member 111 may bear the image sensor 210 (or the image sensor assembly 200) of the camera module 10 or the electronic device. The image sensor 210 may be directly or indirectly connected to the movable member 111. The fixed member 112 may be sleeved at an outer periphery of the movable member 111. A gap may be formed between the fixed member 112 and the movable member 111, such that the movable member 111 is enabled to move relative to the fixed member 112. The image sensor 210 (or the image sensor assembly 200) of the camera module 10 or the electronic device may be arranged and connected to the movable member 111 and move synchronously with the movable member 111.

In some embodiments, the movable member 111 is arranged with a first electrical connection end 1111 (such as but not limited to a solder pad). It should be noted that an identification of the first electrical connection end 1111 shown in FIG. 4 is limited to a form indicating the first electrical connection end 1111, and any solder pad on the movable member 111 may be the first electrical connection end 1111 herein. The first electrical connection end 1111 may be electrically connected to the image sensor 210. The fixed member 112 may be provided with a second electrical connection end 1121 (such as but not limited to a solder pad). It should be noted that an identification of the second electrical connection end 1121 shown in FIG. 4 is limited to a form indicating the second electrical connection end 1121, and any solder pad on the fixed member 112 may be the second electrical connection end 1121 herein). The second electrical connection end 1121 may be electrically connected to a module circuit board 700 of the anti-shake assembly 100, the camera module 10, or the electronic device. When the first electrical connection end 1111 and the second electrical connection end 1121 are electrically connected to each other through an electrical connector (such as but not limited to an elastic member 113), the image sensor 210 may be electrically connected to the module circuit board 700 through the first electrical connection end 1111, the electrical connector, and the second electrical connection end 1121. The module circuit board 700 may transmit the electrical signal of the image sensor 210 to the anti-shake assembly 100 and be electrically connected to assemblies of the camera module 10 or the electronic device such as a circuit board, a power supply, and etc.

It can be understood that, since the fixed member 112 may be connected to and fixed with the anti-shake assembly 100, the camera module 10, or the electronic device, the module circuit board 700 electrically connected to the second electrical connection end 1121 of the fixed member 112 may not need to move with a moving member 121 or the movable member 111. The module circuit board 700 may not need to be welded after being bent. A welding process of the module circuit board 700 in the embodiments of the present disclosure is simple and a size of the module circuit board 700 is small.

The bearing plate 110 may be disposed opposite to the driving mechanism 120 along the direction of the optical axis of the lens 300. The driving mechanism 120 may be disposed at a side of the bearing plate 110. For example, as shown in FIG. 3 and FIG. 4, the driving mechanism 120 may be disposed at a side of the bearing plate 110 away from the image sensor 210, such that the driving mechanism 120 is enabled to drive the bearing plate 110 to move under the bearing plate 110. The driving mechanism 120 may also be arranged at an upper side of the bearing plate 110, for example, at an upper side of the bearing plate 110 and the image sensor assembly 200, such that the driving mechanism 120 is enabled to drive the bearing plate 110 to move at the upper side of the bearing plate 110 and the image sensor assembly 200. An arrangement position of the driving mechanism 120 is not limited in the embodiments of the present disclosure.

The driving mechanism 120 includes the moving member 121 and a plurality of deformable members 122. The moving member 121 may be directly or indirectly connected to the movable member 111. The moving member 121, the movable member 111, and the image sensor 210 (or the image sensor assembly 200) arranged on the movable member 111 may be formed an integral. An end of each of the deformable members 122 may be directly or indirectly connected to the fixed member 112, and another end of each of the deformable members 122 may be directly or indirectly connected to the moving member 111. The deformable members 122 may be deformed in a power-on state for driving the integral formed by the moving member 121, the movable member 111, and the image sensor 210 to move, such that the moving member 121, the movable member 111, and the image sensor 210 are enabled to move synchronously. For example, the deformable members 122 may be deformed in the power-on state for driving the moving member 121, the movable member 111, and the image sensor 210 to move along a direction perpendicular to the optical axis of the lens 300 or to rotate along a direction around the optical axis of the lens 300. The image sensor 210 may rotate along a X-axis and Y-axis, and rotate in a XOY plane under an action of the anti-shake assembly 100.

In some embodiments, the direction of the optical axis of the lens 300 may be the first direction H1. The first direction H1 may be a vertical direction, such as a direction along a Z-axis in a coordinate axis. The direction perpendicular to the optical axis of the lens 300 may be a second direction. The second direction may be any horizontal direction in a horizontal plane, such as a direction along the X-axis or the Y-axis in the coordinate axis. The direction around the optical axis of the lens 300 may be any direction in a plane perpendicular to the optical axis of the lens 300, such as any direction in the XOY plane of the coordinate axis.

In some embodiments, materials of the deformable members 122 are made of shape memory alloys (SMA). The shape memory alloys may be heated and deformed when the shape memory alloys are in a power-on state. A length of each of the deformable members 122 may changes when a corresponding one of the deformable members 122 are power-on. When the deformable members 122 are power-on or when currents of different sizes are transmitted to the deformable members 122, the length of each of the deformable members 122 may change. Since the end of each of the deformable members 122 is fixed with the fixed member 112 of the bearing plate 110, and the another end of the deformable members 122 moves with the moving member 121, the deformable members 122 whose lengths change may drive the moving member 121 to move, and the moving member 121 may drive the movable member 111 and the image sensor 210 directly or indirectly connected to the moving member 121 to move.

In the anti-shake assembly 100 of the embodiment of the present disclosure, the driving mechanism 120 includes the moving member 121 and the deformable members 122. The moving member 121 is connected to the movable member 111 of the bearing member plate 110, the end of each of the deformable members 122 is connected to the moving member 121, and the another end of each of the deformable members 122 is connected to the fixed member 112 of the bearing plate 110. In this way, when the deformable members 122 are deformed, the moving member 121 may be driven to move, and the moving member 121 may drive the movable member 111 and the image sensor 210 arranged on the movable member 111 to move, thereby, the anti-shake assembly 100 of the embodiments of the present disclosure may realize anti-shake functions of the image sensor 210. Two ends of each of the deformable members 122 are respectively connected to the fixed member 112 and the moving member 111, the deformable members 122 do not need to occupy a space of the movable member 111 and may not affect distribution of a circuit on the movable member 111, thereby reducing influence of the deformable members 122 on the circuit of the movable member 111. Besides, the moving member 121 and the bearing plate 110 are independent of each other. In the production and assembly process, the moving member 121 and the bearing plate 110 may be produced in modules respectively, so as to improve the adaptability of the moving member 121 and the bearing plate 110. It should be noted that the moving member 121 and the bearing plate 110 may be produced together by a same set of production process. The production process of the moving member 121 and the bearing plate 110 are not limited in the embodiments of the present disclosure.

As shown in FIG. 3 and FIG. 4, the driving mechanism 120 may further include a plurality of movable ends 123 and a plurality of fixed ends 124.

The movable ends 123 may be disposed on the moving member 121, and the fixed ends 124 may be disposed on the fixed member 112. The end of each of the deformable members 122 may be directly or indirectly connected to a corresponding one of the movable ends 123, and the another end of each of the deformable members 122 may be directly or indirectly connected to a corresponding one of the fixed ends 124. When a length of one of the deformable members 122 changes in the power-on state, the corresponding one of the movable ends 123 connected with the one of the deformable members 122 may move with the moving member 121 as the length of the one of the deformable members 122 changes, and the corresponding one of the fixed ends 124 connected with the one of the deformable members 122 may be fixed together with the fixed member 112 without moving.

In some embodiments, one or more movable ends 123 may be arranged at intervals and connected to the moving member 121. Two or more of the movable ends 123 may be arranged adjacent (or connected to each other) without intervals. Besides, one or more fixed ends 124 may be arranged at intervals and connected to the fixed member 112 (e.g., arranged at intervals at a back surface of the fixed member 112). Two or more of the fixed ends 124 may be arranged adjacent (or connected to each other) without intervals. In the embodiments of the present disclosure, arrangements of the movable ends 123 and the fixed ends 124 are not limited in the embodiments of the present disclosure.

In some embodiments, as shown in FIG. 4, the driving mechanism 120 may include two movable ends 123 arranged with an interval therebetween and two fixed ends 124 arranged with an interval therebetween. For example, the driving mechanism 120 includes a first movable end 1231, a second movable end 1232, a first fixed end 1241, and a second fixed end 1242. The first movable end 1231, the second movable end 1232, the first fixed end 1241, and the second fixed end 1242 may form a quadrilateral structure. The first movable end 1231 and the second movable end 1232 may be located on a diagonal L1 of the quadrilateral structure, and the first fixed end 1241 and the second fixed end 1242 may be located on another diagonal L2 of the quadrilateral structure. The first movable end 1231, the second movable end 1232, the first fixed end 1241, and the second fixed end 1242 may form four vertices of the quadrilateral structure. The anti-shake assembly 100 may also be provided with four deformable members 122 arranged corresponding to four sides of the quadrilateral structure. Based on the characteristic that the quadrilateral structure is easy to deform, when the deformable members 122 are deformed, the deformable members 122 are more likely to be affected by the movable ends 123 and the fixed ends 124 located at the vertices, so that the quadrilateral structure changes, enabling the movable member 111 and the image sensor 210 disposed on the movable member 111 to be easier to be driven to move.

In some embodiments, one or more movable ends 123 may be integrally formed on the moving member 121, and one or more fixed ends 124 may be integrally formed on the fixed member 112. When each of the deformable members 122 is connected to the movable end 123 or the fixed end 124 by winding, inserting, welding, etc., compared with a solution in which each of the deformable members 122 is directly connected to the fixed member 112, in the process of connecting each of the deformable members 122 to the moving end 123 and the fixed end 124 in the embodiments of the present disclosure, the fixed member 112 is not easy to be damaged, and circuit wires on the fixed member 112 are not easy to be damaged.

In some embodiments, both the number of the movable ends 123 and the number of the fixed ends 124 may be substantially equal to half of the number of the deformable members 122. In this way, one movable end 123 may be connected to ends of two deformable members 122, and one fixed end 124 may also be connected to ends of two deformable members 122, such that the driving mechanism 120 in the embodiments of the present disclosure is enabled to be provided with relatively less movable ends 123 and fixed ends 124.

Figure 5:
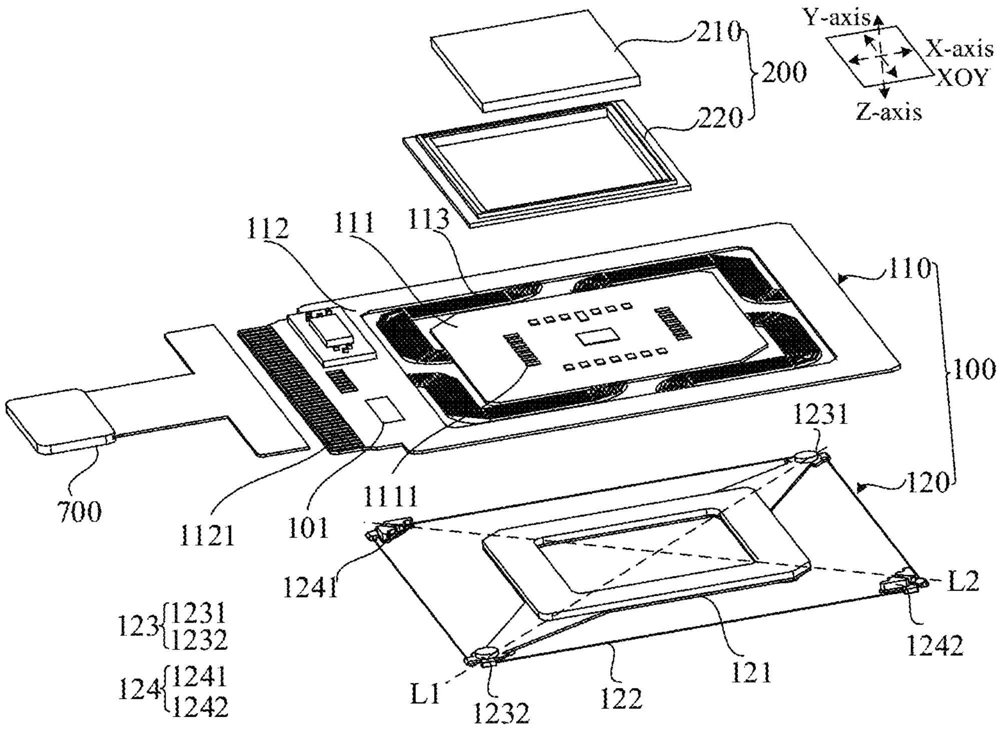
FIG. 5 is another schematic exploded diagram of the anti-shake assembly and the image sensor assembly shown in FIG. 3 according to some embodiments of the present disclosure.

In some embodiments, the anti-shake assembly 100, the camera module 10, or the electronic device may also include a driving control chip. The driving control chip may be disposed on the fixed member 112 of the bearing plate 110 and form a driving circuit that causes the deformable members 122 to deform. Alternatively, as shown in FIG. 5, FIG. 5 is another schematic exploded diagram of the anti-shake assembly and the image sensor assembly shown in FIG. 3 according to some embodiments of the present disclosure. A driving circuit 101 may be arranged on the fixed member 112. The driving control chip may be electrically connected to the driving circuit 101 on the fixed member 112 through the module circuit board 700 mentioned above. At least one of the movable ends 123 and the fixed ends 124 may be a conductive member, such that the driving circuit 101 is enabled to be electrically connected to the deformable members 122 through the movable ends 123, or through the fixed ends 124, or through both the movable ends 123 and the fixed ends 124, thereby, the driving control chip may supply driving current to the deformable members 122.

In some embodiments, each of the movable ends 123 and each of the fixed ends 124 may have certain heights, such that the movable ends 123 and the fixed ends 124 are enabled to separate the bearing plate 110 from the moving member 121 and the deformable members 122. In this way, when the deformable members 122 are deformed, the deformable members 122 are not easy to contact with the bearing plate 110, avoiding deformation interference of the bearing plate 110 to the deformable members 122, and preventing the circuit on the bearing plate 110 from being in contact with the deformable members 122 to cause short circuit.

In some embodiments, the anti-shake assembly 100 may also be provided with one or more supporting members. Each of the supporting members may be located between the moving member 121 and the bearing plate 110, such that each of the supporting members may separate the moving member 121 from the bearing plate 110.

The anti-shake assembly 100 of the embodiments of the present disclosure is provided with the movable ends 123 and the fixed ends 124. The deformable members 122 are connected to the fixed member 112 of the bearing plate 110 and the moving member 121 of the driving mechanism 120 through the movable ends 123 and the fixed ends 124. The connection process of the deformable members 122 is simple, and the deformable members 122 may not affect the circuit wires on the fixed member 112. The movable ends 123 and the fixed ends 124 may be used as the conductive members to realize power supply of the deformable members 122, thereby simplifying arrangement of a power supply circuit of the deformable members 122 and realizing miniaturization design of the anti-shake assembly 100.

Figure 6:
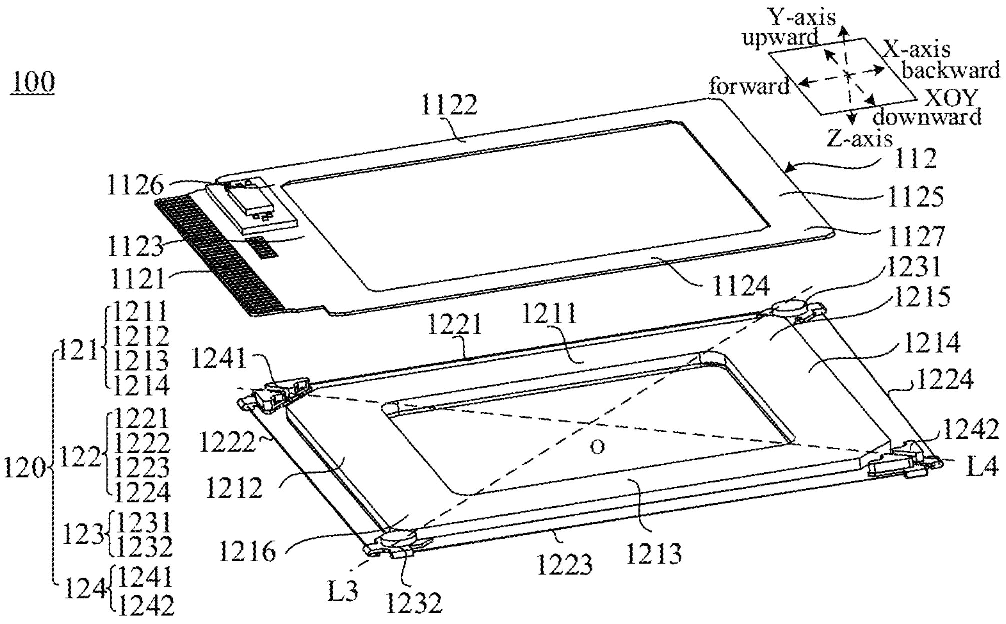
FIG. 6 is a schematic structure diagram of a driving mechanism and a bearing plate shown in FIG. 4 according to some embodiments of the present disclosure.
Figure 7:
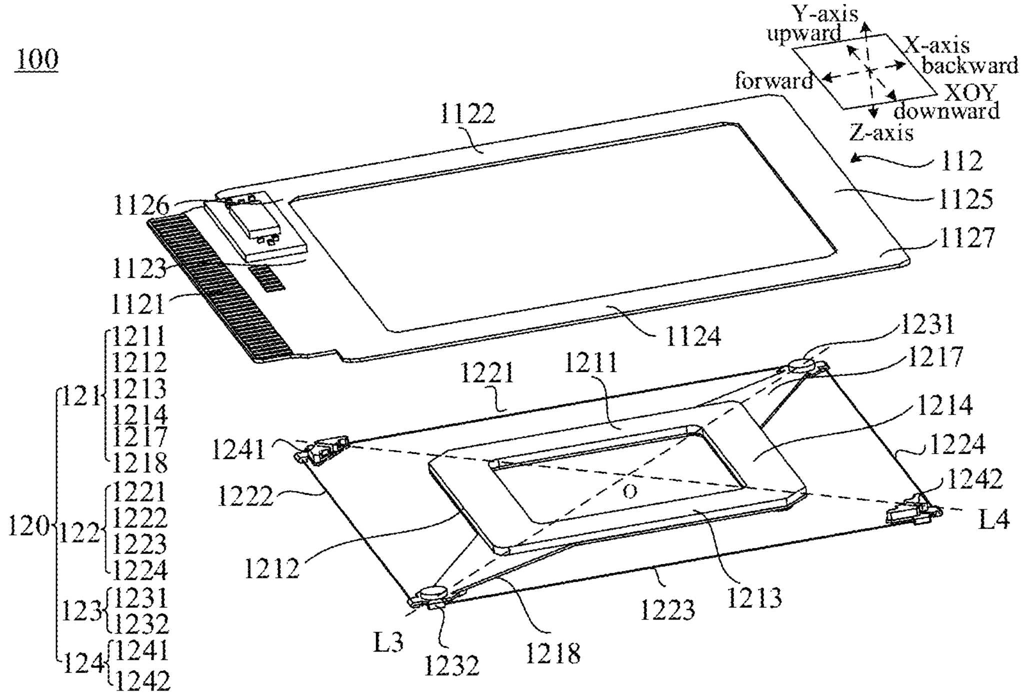
FIG. 7 is another schematic structure diagram of a driving mechanism and a bearing plate shown in FIG. 4 according to some embodiments of the present disclosure.

As shown in FIG. 3, FIG. 4, FIG. 6, and FIG. 7, FIG. 6 is a schematic structure diagram of a driving mechanism and a bearing plate shown in FIG. 4 according to some embodiments of the present disclosure, and FIG. 7 is another schematic structure diagram of a driving mechanism and a bearing plate shown in FIG. 4 according to some embodiments of the present disclosure. The deformable members 122 may be arranged around the moving member 121, such that the deformable members 122 are enabled to better control the movement of the moving member 121.

In some embodiments, the moving member 121 of the driving mechanism 120 may be substantially a rectangular frame structure. The moving member 121 may include a first portion 1211, a second portion 1212, a third portion 1213, and a fourth portion 1214 which are connected end to end. The first portion 1211 and the third portion 1213 are arranged oppositely and may be arranged along an X-axis. The second portion 1212 and the fourth portion 1214 are arranged oppositely and may be arranged along a Y-axis. A first end portion 1215 may be formed between the first portion 1211 and the fourth portion 1214, and a second end portion 1216 may be formed between the second portion 1212 and the third portion 1213. The first end portion 1215 and the second end portion 1216 may be located on a diagonal line L3 of the moving member 121.

The fixed member 112 may be a rectangular frame structure, and the movable member 111 may be located inside the rectangular frame. The fixed member 112 may include a fifth portion 1122, a sixth portion 1123, a seventh portion 1124, and an eighth portion 1125, which are connected end to end. The fifth portion 1122 and the seventh portion 1124 are arranged opposite to each other, and the sixth portion 1123 and the eighth portion 1125 are arranged opposite to each other. The fifth portion 1122 may be arranged opposite to the first portion 1211, the sixth portion 1123 may be arranged opposite to the second portion 1212, the seventh portion 1124 may be arranged opposite to the third portion 1213, and the eighth portion 1125 may be arranged opposite to the fourth portion 1214. A third end portion 1126 may be formed between the fifth portion 1122 and the sixth portion 1123, and a fourth end portion 1127 may be formed between the seventh portion 1124 and the eighth portion 1125. The third end portion 1126 and the fourth end portion 1127 may be located on an extending line of another diagonal line L4 of the moving member 121.

When the driving mechanism 120 includes two movable ends 123 and two fixed ends 124, i.e., the first movable end 1231, the second movable end 1232, the first fixed end 1241, and the second fixed end 1242, the first movable end 1231 may be arranged on the first end portion 1215, the second movable end 1232 may be arranged on the second end portion 1216, the first fixed end 1241 may be arranged on the third end portion 1126, and the second fixed end 1242 may be arranged on the second end portion 1127. In this way, the first movable end 1231 and the second movable end 1232 may be located on the diagonal line L3 of the moving member 121, and the first fixed end 1241 and the second fixed end 1242 may be located on the extending line of the diagonal line L4 of the moving member 121. In some embodiments, the diagonal line L3 of the moving member 121 may be collinear with the diagonal line L1 of the quadrilateral structure, and the diagonal line L4 of the moving member 121 may be collinear with the diagonal line L2 of the quadrilateral structure.

The deformable members 122 may include a first deformable member 1221, a second deformable member 1222, a third deformable member 1223, and a fourth deformable member 1224. The first deformable member 1221 may be arranged opposite to the first portion 1211 and the fifth portion 1122, the second deformable member 1222 may be arranged opposite to the second portion 1212 and the sixth portion 1123, the third deformable member 1223 may be arranged opposite to the third portion 1213 and the seventh portion 1124, and the fourth deformable member 1224 may be arranged opposite to the fourth portion 1214 and the eighth portion 1125. An end of the first deformable member 1221 may be connected to the first movable end 1231, and another end of the first deformable member 1221 may be connected to the first fixed end 1241. An end of the second deformable member 1222 may be connected to the first fixed end 1241, and another end of the second deformable member 1222 may be connected to the second movable end 1232. An end of the third deformable member 1223 may be connected to the second movable end 1232, and another end of the third deformable member 1223 may be connected to the second fixed end 1242. An end of the fourth deformable member 1224 may be connected to the second fixed end 1242, and another end of the fourth deformable member 1224 may be connected to the first movable end 1231.

In some embodiments, the first deformable member 1221, the second deformable member 1222, the third deformable member 1223, and the fourth deformable member 1224 may cooperate with each other for driving the moving member 121 to move. For example, the moving member 121 may move along the direction perpendicular to the optical axis of the lens 300, or rotate along the direction around the optical axis of the lens 300.

In some embodiments, in the case the first deformable member 1221 is power-on to be shortened and shrunk, and/or the third deformable member 1223 is power-on to be lengthened and relaxed, the first deformable member 1221 and the third deformable member 1223 may drive the moving member 121, the movable member 111, and the image sensor 210 to move forward along a direction of the X-axis. In the case the first deformable member 1221 is power-on to be lengthened and relaxed, and/or the third deformable member 1223 is power-on to be shortened and shrunk, the first deformable member 1221 and the third deformable member 1223 may drive the moving member 121, the movable member 111, and the image sensor 210 to move backward along the direction of the X-axis. In the case the second deformable member 1222 is power-on to be shortened and shrunk, and/or the fourth deformable member 1224 is power-on to be lengthened and relaxed, the second deformable member 1222 and the fourth deformable member 1224 may drive the moving member 121, the movable member 111, and the image sensor 210 to move upward along a direction of the Y-axis. In the case the second deformable member 1222 is power-on to be lengthened and relaxed, and/or the fourth deformable member 1224 is power-on to be shortened and shrunk, the second deformable member 1222 and the fourth deformable member 1224 may drive the moving member 121, the movable member 111, and the image sensor 210 to move downward along the direction of the Y-axis. In the case the first deformable member 1221 and the third deformable member 1223 are power-on at the same time to be shortened, the first deformable member 1221 and the third deformable member 1223 may drive the moving member 121, the movable member 111, and the image sensor 210 to rotate counterclockwise in the XOY plane along the diagonal line L3. In the case the first deformable member 1221 and the third deformable member 1223 are power-on at the same time to be lengthen, the first deformable member 1221 and the third deformable member 1223 may drive the moving member 121, the movable member 111, and the image sensor 210 to rotate clockwise in the XOY plane along the diagonal line L3. In the case the second deformable member 1222 and the fourth deformable member 1224 are power-on at the same time to be shortened, the second deformable member 1222 and the fourth deformable member 1224 may drive the moving member 121, the movable member 111, and the image sensor 210 to rotate clockwise in the XOY plane along the diagonal line L4. In the case the second deformable member 1222 and the fourth deformable member 1224 are power-on at the same time to be lengthen, the second deformable member 1222 and the fourth deformable member 1224 may drive the moving member 121, the movable member 111, and the image sensor 210 to rotate counterclockwise in the XOY plane along the diagonal line L4.

In the anti-shake assembly 100 of the embodiments of the present disclosure, the first deformable member 1221, the second deformable member 1222, the third deformable member 1223, and the fourth deformable member 1224 surround and are arranged opposite to the first portion 1211, the second portion 1212, the third portion 1213, and the fourth portion 1214 of the moving member 121. The deformable members 122 may symmetrically and uniformly control the movement of the moving member 121, and the movement distance and movement direction of the moving member 121 are controllable, which is convenient for the anti-shake assembly 100 to calculate anti-shake parameters of the image sensor 210. The deformable members 122 may drive the moving member 121 and the image sensor 210 to realize the movement along the directions of the X-axis and the Y-axis to anti-shake, and may also realize the rotation in the XOY plane to anti-shake. The anti-shake assembly 100 may realize anti-shake compensation in various shaking scenes, the camera module 10 may realize the anti-shake compensation in various shaking scenes, and the adaptability of the camera module 10 is better.

It should be noted that, in addition to driving the moving member 121, the movable member 111, and the image sensor 210 to move along the direction perpendicular to the optical axis of the lens 300 or to rotate along the direction around the optical axis of the lens 300, the deformable members 122 in the embodiments of the present disclosure also drive the moving member 121, the movable member 111, and the image sensor 210 to move in other ways. For example, the deformable members 122 may also drive the moving member 121, the movable member 111, and the image sensor 210 to move upward and downward along the direction of the optical axis of the lens 300. Alternately, the deformable members 122 may drive the moving member 121, the movable member 111, and the image sensor 210 to flip around the direction perpendicular to the optical axis of the lens 300, and arrangements of the deformable members 122 and the moving member 121 may be changed accordingly (e.g., the moving member 121 and the deformable members 122 are vertically arranged at 90 degrees). The movement ways of the moving member 121, the movable member 111, and the image sensor 210 driven by the deformable members 122 are not limited in the embodiments of the present disclosure.

As shown in FIG. 6 and FIG. 7, the moving member 121 may further include a first extending portion 1217 and a second extending portion 1218.

The first extending portion 1217 may be disposed between the first portion 1211 and the fourth portion 1214 of the moving member 121. The first extending part 1217 may be disposed on the first end portion 1215 of the moving member 121 and extend along a direction away from a center point O of the moving member 121 (i.e., extend outward along a direction away from the moving member 121). The second extending portion 1218 may be disposed between the second portion 1212 and the third portion 1213 of the moving member 121. The second extending part 1218 may be disposed on the second end portion 1216 of the moving member 121 and extend along the direction away from the center point O of the moving member 121. The first extending portion 1217 and the second extending portion 1218 may be located on the diagonal line L3 of the moving member 121. The first extending portion 1217 and the second extending portion 1218 may extend along a direction away from each other. The first extending portion 1217 and the second extending portion may extend along the direction away from the moving member 121.

The first movable end 1231 may be disposed at an end of the first extending portion 1217 away from the center point O, and the second movable end 1232 may be disposed at an end of the second extending portion 1218 away from the center point O. The end of the first deformable member 1221 may be connected to the first extending portion 1217 such as the first movable end 1231, and the another end of the first deformable member 1221 may be connected to the fixed member 112 such as the first fixed end 1241 connected to the fixed member 112. The end of the second deformable member 1222 may be connected to the second extending portion 1218 such as the second movable end 1232, and the another end of the second deformable member 1222 may be connected to the fixed member 112 such as the first fixed end 1241 connected to the fixed member 112. The end of the third deformable member 1223 may be connected to the second extending portion 1218 such as the second movable end 1232, and the another end of the third deformable member 1223 may be connected to the fixed member 112 such as the second fixed end 1242 connected to the fixed member 112. The end of the fourth deformable member 1224 may be connected to the first extending portion 1217 such as the first movable end 1231, and the another end of the fourth deformable member 1224 may be connected to the fixed member 112 such as the second fixed end 1242 connected to the fixed member 112.

In some embodiments, a size of a frame formed by the first portion 1211, the second portion 1212, the third portion 1213, and the fourth portion 1214 of the moving member 121 may be adapted to a size of the movable member 111 of the bearing plate 110, such that the moving member 121 is enabled to carry the movable member 111. A projection of the first extending portion 1217 of the moving member 121 projected on the bearing plate 110 and a projection of the second extending portion 1218 of the moving member 121 projected on the bearing plate 110 may be located on the fixed member 112 of the bearing plate 110, such that a size of the quadrilateral structure formed by the two movable ends 123 and the two fixed ends 124 may be adapted to a size of the fixed member 112. In this way, a length of each of the deformable members 122 may be larger, and the deformable members 122 may drive the moving member 121, the movable member 111, and the image sensor 210 to move in a larger stroke.

In some embodiments, the shape and structure of the moving member 121 in the embodiments of the present disclosure are not limited to the above examples. For example, a third extending portion may be provided between the first portion 1211 and the second portion 1212 of the moving member 121, a fourth extending portion may be provided between the third portion 1213 and the fourth portion 1214 of the moving member 121. The structure of the moving member 121 is not limited in the embodiments of the present disclosure.

The moving member 121 of the embodiments of the present disclosure is provided with the first extending portion 1217 and the second extending portion 1218. On the one hand, the first extending portion 1217 and the second extending portion 1218 may bear the first movable end 1231 and the second movable end 1232. On the other hand, the first extending portion 1217 and the second extending portion 1218 may enable the length of each of the deformable members 122 to be larger, the deformable members 122 may drive the moving member 121, the movable member 111, and the image sensor 210 to move in a larger stroke, and the anti-shake compensation of the anti-shake assembly 100 for the image sensor 210 may be greater.

The anti-shake assembly 100, the camera module 10, or the electronic device may further include a control chip such as a first control chip. The first control chip may be arranged on the fixed member 112. Alternatively, the first control chip may be electrically connected to a control circuit on the fixed member 112 through the module circuit board 700, or the first control chip may be electrically connected to the movable member 111 through an electrical connecting member (e.g., an elastic member 113). The first control chip may monitor motion parameters of the movable member 111 and the image sensor 210. The first control chip may control the motion of the moving member 111 in real time based on the motion parameters monitored and shaking parameters of the camera module 10, such that the anti-shake compensation for the image sensor 210 is enabled to be more accurate, and the closed-loop control of the anti-shake assembly 100 is enabled to be realized.

Figure 8:
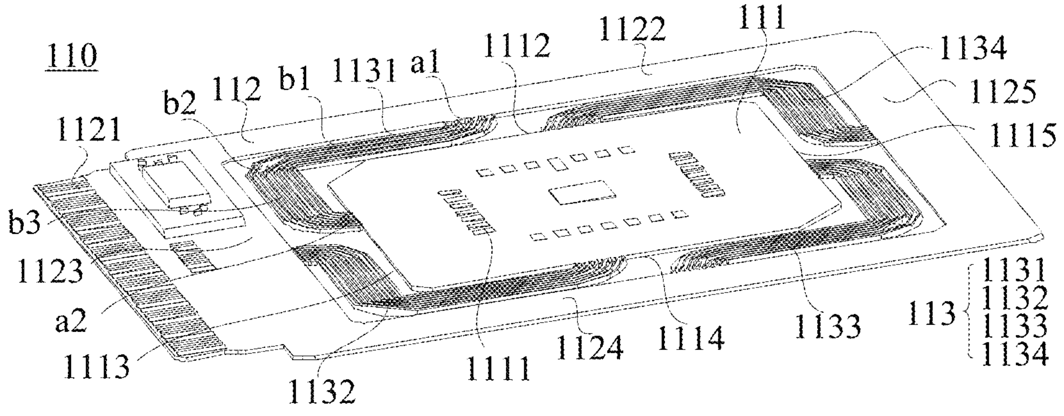
FIG. 8 is a schematic structure diagram of a bearing plate shown in FIG. 4 according to some embodiments of the present disclosure.

As shown in FIG. 8 in conjunction with FIG. 3 and FIG. 4, FIG. 8 is a schematic structure diagram of a bearing plate shown in FIG. 4 according to some embodiments of the present disclosure. The bearing plate 110 may further include one or more elastic members 113.

The one or more elastic members 113 may be disposed between the movable member 111 and the fixed member 112. For example, the one or more elastic members 113 may be disposed between an outer peripheral edge of the movable member 111 and an inner peripheral edge of the fixed member 112. A first end a1 of each of the one or more elastic members 113 may be connected to the fixed member 112 and fixed, and a second end a2 of each of the one or more elastic members 113 may be connected to the movable member 111 and move with the movable member 111. Each of the one or more elastic members 113 may provide the movable member 111 with an elastic force opposite to a movement direction of the movable member 111 to restrain the movement of the movable member 111. The elastic force provided by each of the one or more elastic members 113 and a driving force provided by the driving mechanism 120 may act together on the movable member 111, such that the movable member 111 is enabled to stay at a certain position stably, and the anti-shake control for the movable member 111 and the image sensor 210 is enabled to be more accurate.

In some embodiments, the elastic members 113 may be made of a material having elastic restoring force, and the elastic members 113 may include, but are not limited to, various springs. Each of the elastic members 113 may include one or more sub-elastic members. For example, in FIG. 8, each of the elastic members 113 may be helically formed by a plurality of elastic filaments. The first end a1 of each of the elastic members 113 may be an end portion formed by the elastic filaments, the second end a2 of each of the elastic members 113 may be the another end portion formed by the elastic filaments. In actual production, each of the elastic members 113 may also be formed by only one spring. The structures of the elastic members 113 are not limited in the embodiments of the present disclosure. All structures of the elastic members 113 that may withstand a force generated by the movement of the movable member 111 driven by the driving mechanism 120 and may have the elastic restoring force are within the scope of protection of the embodiments of the present disclosure.

In some embodiments, a projection of the first end a1 of each of the elastic members 113 projected on the movable member 111 may be staggered from the second end a2 of a corresponding one of the elastic members 113. For example, the first end a1 and the second end a2 are respectively arranged at different sides of the movable member 111. Each of the elastic members 113 is connected to a side of the fixed member 112 and a side of the movable member Ill corresponding to the side of the fixed member 112. Each of the elastic members 113 may form a torsion spring structure, and a plurality of elastic members 113 have a greater restraining force on the movable member 111, thereby improving the stability of the movable member 111.

In some embodiments, as shown in FIG. 8, each of the elastic members 113 may include a first elastic portion b1, a first corner portion b2, and a second elastic portion b3, which are connected in sequence. The first elastic portion b1 may be connected to the fixed member 112, the second elastic portion b3 may be connected to the movable member 111. A first connecting line between the first elastic portion b1 and the first corner portion b2 and a second connecting line between the first corner portion b2 and the second elastic portion b3 may form a preset angle. The present angle may be, but not limited to, 90 degrees. Each of the elastic members 113 in the embodiments of the present disclosure includes three portions mentioned above. Each of the elastic members 113 may form the torsion spring structure with a large amplitude. Each of the elastic members 113 has a great restraining force on the movable member 111, such that the elastic members 113 are enabled to ensure the stability of the movable element 111.

In order to further improve the stability of the movable member 111, the elastic members 113 on the bearing plate 110 may be arranged around the outer periphery of the movable member 111 in sequence. For example, as shown in FIG. 8, the elastic members 113 may be arranged counterclockwise around the outer periphery of the movable member 111. The elastic members 113 may be arranged counterclockwise in an order of the first end, the second end, the first end, the second end . . . . In some embodiments, the elastic members may also be arranged clockwise around the outer periphery of the movable member 111. The elastic members 113 may be arranged clockwise in the order of the first end, the second end, the first end, the second end . . . .

In two adjacent elastic members 113, the second end a2 of one of the elastic members 113 (e.g., a front elastic member 113) may be adjacent to a projection of the first end a1 of another elastic members 113 (e.g., a rear elastic member 113) projected on the movable member 111, and the second end a2 of one of the elastic members 113 and the projection of the first end a1 of the another elastic members 113 projected on the movable member 111 may be located at a same side of the movable member 111. In some embodiments, the two adjacent elastic members 113 may refer to a distance between the first end a1 of the front elastic member 113 and the second end a2 of the rear elastic member 113 may be within a small preset range, such that an elastic torsion force of the two adjacent elastic members 113 is enabled to cover an entire side of the movable member 111, and the stability of the movable member 111 is enabled to be better.

When the fixed member 112 is the rectangular frame structure and the movable member 111 is a rectangular plate structure, the fixed member 112 may include the fifth portion 1122, the sixth portion 1123, the seventh portion 1124, and the eighth portion 1125 mentioned above, and the movable member 111 may include a first side 1112, a second side 1113, a third side 1114, and a fourth side 1115. The bearing plate 110 may include four elastic members 113, such as a first elastic member 1131, a second elastic member 1132, a third elastic member 1133, and a fourth elastic member 1134. The first end a1 of the first elastic member 1131 may be connected to the fifth portion 1122, and the second end a2 of the first elastic member 1131 may be connected to the second side 1113. The first end a1 of the second elastic member 1132 may be connected to the sixth portion 1123, and the second end a2 of the second elastic member 1132 may be connected to the third side 1114. The first end a1 of the third elastic member 1133 may be connected to the seventh portion 1124, and the second end a2 of the third elastic member 1133 may be connected to the fourth side 1115. The first end a1 of the fourth elastic member 1134 may be connected to the eighth portion 1125, and the second end a2 of the fourth elastic member 1134 may be connected to the first side 1112. In this way, each of the four elastic members 113 is connected to the side of the fixed member 112 and an adjacent side of the movable member 111 corresponding to the side of the fixed member 112. Each of the four elastic members 113 may form a torsion spring structure. On the one hand, the torsion spring structure may provide a traction force for the movement of the movable member 111 to improve the stability of the movable member 111. On the other hand, the torsion spring structure may prevent the movable member 111 from moving too much that may result in a separation between the elastic members 113 and the movable member 111.

It should be noted that the embodiment above is only an exemplary connection manner of the elastic members 113 with the movable member 111 and the fixed member 112 in the embodiments of the present disclosure. The connection manner of the elastic members 113 is not limited to the embodiment above. For example, each of the elastic members 113 may also be directly connected to a frame of the fixed member 112 and a side of a corresponding movable member 111. The connection manner of the elastic members 113 is not limited in the embodiments of the present disclosure.

In order to simplify the circuit configuration of the anti-shake assembly 100, the camera module 10, or the electronic device, the one or more elastic members 113 may be electrical connectors with conductivity produced from conductive materials.

In some embodiments, the movable member 111 may be provided with the first electrical connection end 1111 directly or indirectly electrically connected to the image sensor 210, and the fixed member 112 may be provided with the second electrical connection end 1121 directly or indirectly electrically connected to an external circuit. Each of the elastic members 113 may be directly or indirectly electrically connected to the second electrical connection end 1121 and the first electrical connection end 1111, such that the external circuit is enabled to be directly or indirectly electrically connected to the image sensor 210 through the second electrical connection end 1121, the elastic members 113, and the first electrical connection end 1111.

In some embodiments, the first electrical connection end 1111 may be, but not limited to, a solder pad structure on the movable member 111, and the second electrical connection end 1121 may be, but not limited to, a solder pad structure on the fixed member 112. The external circuit may be, but not limited to be electrically connected to the second electrical connection end 1121 through the module circuit board 700.

In some embodiments, the external circuit may supply power to the image sensor 210, and the external circuit may also transmit the control signal to the image sensor 210, such that a processor of the camera module 10 and a processor of the electronic device 1 are enabled to control the image sensor 210.

In the anti-shake assembly 100 in the embodiments of the present disclosure, the external circuit may be electrically connected to the image sensor 210 through the elastic members 113. The elastic members 113 may be used as elastic damping members or as electrical connectors. The elastic members 113 have multiple uses, and the anti-shake assembly 100 does not require to additionally arrange a flexible circuit board 660 to supply power to the image sensor 210, such the elastic members 113 in the embodiments of the present disclosure are enabled to simplify the circuit configuration of the anti-shake assembly 100, thereby realizing the miniaturization design of the anti-shake assembly 100.

It should be noted that the image sensor 210 in the embodiments of the present disclosure may also be electrically connected in other ways, such as through the flexible circuit board 660. The electrical connection method of the image sensor 210 is not limited in the embodiments of the present disclosure.

It should be noted that the structure of the anti-shake assembly 100 in the embodiments of the present disclosure is not limited to the embodiments above. For example, the anti-shake assembly 100 may be provided with elastic structures on the top and bottom sides of the bearing plate 110 to further improve the stability of the image sensor 210. For another example, the anti-shake assembly 100 may also adopt other driving methods so that the image sensor 210 may move in other directions. The structure of the anti-shake assembly 100 is not limited in the embodiments of the present disclosure.

Based on the anti-shake assembly 100 described above, as shown in FIG. 2, FIG. 3, and FIG. 9, FIG. 9 is another schematic exploded diagram of the camera module shown in FIG. 1 according to some embodiments of the present disclosure. The camera module 10 in the embodiments of the present disclosure may further include a focus assembly 600. The focus assembly 600 may be directly or indirectly connected to the lens 300, and drive the lens 300 to move. For example, the focus assembly 600 may drive the lens 300 to move along the direction of the optical axis of the lens 300.

At least portion of the focus assembly 600 may be located in the accommodating space formed by the housing 400. The focus assembly 600 may be arranged opposite to the anti-shake assembly 100 along the direction of the optical axis of the lens 300. The focus assembly 600 and the anti-shake assembly 100 may be arranged in a stack along the first direction H1. In some embodiments, the focus assembly 600 may include a bearing member 610, a magnetic member 620, and a conductive member 630.

The bearing member 610 may carry the lens 300, and the bearing member 610 may be but not limited to be a bearer of the lens 300. The magnetic member 620 may generate a magnetic field, and the bearing member 610 may be located in the magnetic field. The conductive member 630 may be arranged opposite to the magnetic member 620 along the direction perpendicular to the optical axis of the lens 300. The conductive member 630 may generate a force under an action of the magnetic member 620, and the force may enable the bearing member 610 to move up and down along the direction of the optical axis of the lens 300.

In some embodiments, the magnetic member 620 may be, but is not limited to, a magnetic element that may generate a magnetic field such as a permanent magnet, an electromagnet, and etc. The bearing member 610 may be defined with an accommodating groove, and the magnetic member 620 may be located in the accommodating groove. The magnetic member 620 may include one or more sub-magnetic members. For example, the magnetic member 620 may include four sub-magnetic elements, and the four sub-magnetic elements may be uniformly arranged at intervals around the bearing member 610 along the direction around the optical axis of the lens 300. The conductive member 630 may correspondingly include a plurality of sub-conductive members, such that each of the sub-conductive members may be disposed opposite to a corresponding one of the sub-magnetic elements. The structures of the magnetic member 620 and the bearing member 610 are not limited in the embodiments of the present disclosure.

In some embodiments, the conductive member 630 may be, but not limited to, a coil structure. An external power supply (e.g., a power supply of the electronic device, the module circuit board 700) may power a coil on, such that the conductive member 630 may generate a force driving the bearing member 610 to move up and down along the first direction H1 under the action of the magnetic member 620.

Figure 9:
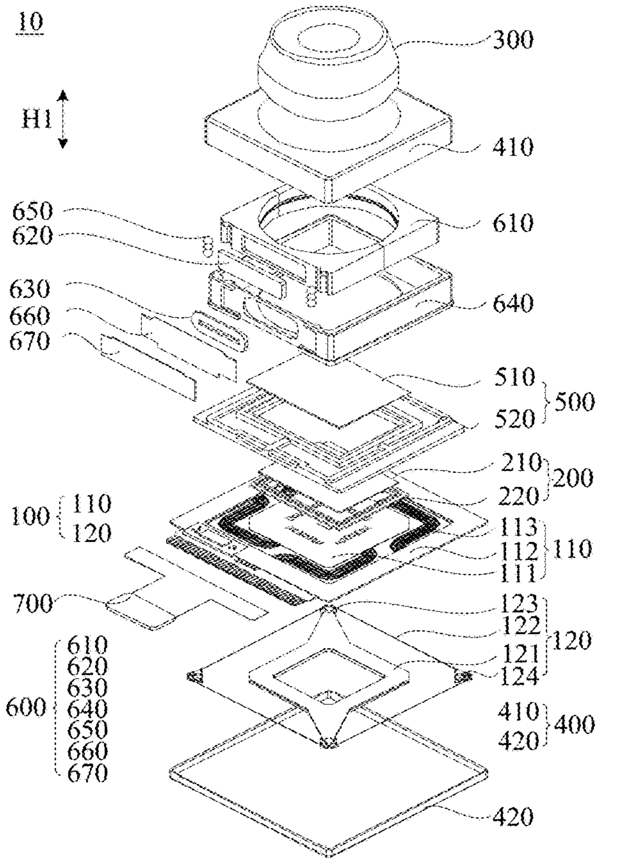
FIG. 9 is another schematic exploded diagram of the camera module shown in FIG. 1 according to some embodiments of the present disclosure.

In some embodiments, as shown in FIG. 9, the focus assembly 600 may further include a bracket 640. The bracket 640 may be fixedly connected to the housing 400 of the camera module 10 without moving with the magnetic member 620. The conductive member 630 may also be disposed on the bracket 640. For example, the bracket 640 is defined with a groove, and the conductive member 630 may be disposed in the groove.

In some embodiments, the bracket 640 may also be defined with a limiting groove extending along the first direction H1. The bearing member 610 may also be provided with a ball structure 650, and the ball structure 650 may be accommodated in the limiting groove. When the conductive member 630 generates the force under the action of the magnetic member 620, the force may enable the bearing member 610 to move up and down relative to the bracket 640 along the first direction H1 under a rolling action of the ball structure 650.

In some embodiments, the focus assembly 600 may further include the flexible circuit board 660. The flexible circuit board 660 may be disposed in the groove of the bracket 640, so as to be electrically connected to the conductive member 630. The flexible circuit board 660 may supply power and provide a control current to the conductive member 630. In some embodiments, the external power supply may also be electrically connected to the flexible circuit board 660, such that the external power supply is enabled to supply power to the conductive member 630 through the flexible circuit board 660.

In some embodiments, the focus assembly 600 may further include a magnetic conductive sheet 670, disposed in the groove of the bracket 640. The magnetic conductive sheet 670 is configured to provide an adsorption force for the conductive member 630, such that the conductive member 630 is enabled to be fixed on the bracket 640.

In some embodiments, the camera module 10 or the electronic device may further include a control chip such as a second control chip. The second control chip may be electrically connected to the focus assembly 600 through an electrical connector. The second control chip may monitor motion parameters of the lens 300, control the motion of the lens 300 and the bearing member 610 in real time based on the motion parameters monitored and the shaking parameters of the camera module 10, such that the anti-shake compensation for the lens 300 is enabled to be more accurate, and the closed-loop control of the camera module 10 is enabled to be realized.

The focus assembly 600 in the embodiments of the present disclosure may enable the bearing member 610 and the lens 300 to move up and down along the vertical direction through the cooperation of the magnetic member 620 and the conductive member 630. The structure of the focus assembly 600 is simple, and the focus assembly 600 may occupy a small space, thereby realizing the miniaturization design of the camera module 10.

It should be noted that the structure of the camera module 10 in the embodiments of the present disclosure is not limited to the description of the embodiments above. For example, in addition to the anti-shake assembly 100, the image sensor assembly 200, the lens 300, and the focus assembly 600, the camera module 10 may also include, but is not limited to, a micro-gimbal assembly, a lens anti-shake assembly, and the like. The structure of the camera module 10 is not limited in the embodiments of the present disclosure.

Based on the structure of the anti-shake assembly 100 and the camera module 10 described above, the embodiments of the present disclosure also provides an electronic device 1. The electronic device 1 (or simply terminal) includes, but is not limited to, a device that receives/transmits communication signals via a wired connection and/or via a wireless communication network such as a cellular network, a wireless local area network, and etc. Examples of a mobile terminal include, but are not limited to, cellular telephones and conventional laptop and/or handheld receivers or other electronic devices including radiotelephone transceivers. A mobile phone is the electronic device 1 configured with a cellular communication module.

Figure 10:
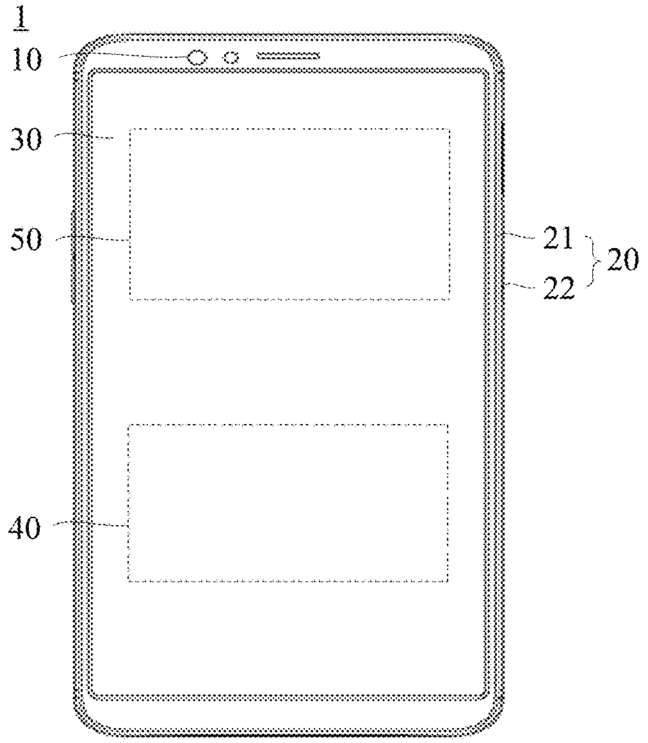
FIG. 10 is a schematic structure diagram of an electronic device according to some embodiments of the present disclosure.

Taking the electronic device 1 as the mobile phone as an example, as shown in FIG. 10, FIG. 10 is a schematic structure diagram of an electronic device according to some embodiments of the present disclosure. In addition to the camera module 10 and the anti-shake assembly 100 in the embodiments above, the electronic device 1 may further include a shell 20, a display screen 30, a power supply 40, and a main board 50.

The shell 20 may include a middle frame 21 and a rear shell 22. The display screen 30 may be covered on a side of the middle frame 21, and the rear shell 22 may be disposed on another side of the middle frame 21. For example, the display screen 30 and the rear shell 22 may be respectively covered on two opposite sides of the middle frame 21 by means of bonding, welding, snap-fitting, and etc. The camera module 10 may be arranged between the display screen 30 and the rear shell 22, and may receive light from external environment.

The rear shell 22 may be a power supply cover of the electronic device 1. The material of the rear shell 22 may be glass, metal, hard plastic, and etc. The rear shell 22 may also be made of other electrochromic materials. The rear shell 22 has a certain structural strength and is mainly configured to protect the electronic device 1. The material of the middle frame 21 may also be glass, metal, hard plastic, and etc. The middle frame 21 also has a certain structural strength, and is mainly configured to support and fix the camera module 10 and other functional assemblies installed between the middle frame 21 and the rear shell 22, such as the power supply 40, the main board 50, and an antenna of the electronic device 1. Since the middle frame 21 and the rear shell 22 are generally directly exposed to the external environment, the materials of the middle frame 21 and the rear shell 22 may have certain properties such as wear-resistance, corrosion-resistance, scratch-resistance, and etc. Alternatively, outer surfaces of the middle frame 21 and the rear shell 22 (i.e., an outer surface of the electronic device 1) is coated with a layer of functional material for wear-resistance, corrosion-resistance, and scratch-resistance.

The display screen 30 may include a display module and a circuit configured to respond to a touch operation on the display module. The display screen 30 may use an organic light-emitting diode (OLED) screen for image display, or a liquid crystal display (LCD) screen for image display. In addition, the display screen 30 may be a flat screen, a hyperbolic screen, or a quad curved screen, which is not limited in the embodiments.

It should be noted that, for mobile phones, the flat screen mentioned above means that the display screen 30 is designed in a flat shape as a whole. The hyperbolic screen mentioned above means that left and right edge areas of the display screen 30 are designed in curved shapes, and other areas of the display screen 30 are still in the flat shape. In this way, not only may reduce a black border of the display screen 30 and increase a visible area of the display screen 30, but also may increase the appearance aesthetic and grip feeling of the electronic device 1. The quad curved screen mentioned above means that the top, bottom, left, and right edge areas of the display screen 30 are designed in curved shapes, and other areas of the display screen 30 are still in the flat shape. In this way, not only may further reduce the black border of the display screen 30 and increase the visible area of the display screen 30, but also may further increase the appearance aesthetic and grip feeling of the electronic device 1.

The main board 50 may be disposed in the housing 400. The main board 50 may be a main control circuit board of the electronic device 1. A processor may be integrated on the main board 50. One or more functional assemblies such as an earphone jack, an acceleration sensor, a gyroscope, a motor, and etc. may also be integrated on the main board 50. The processor on the main board 50 may control the display screen 30 and the camera module 10.

The power supply 40 may be arranged in the housing 400. The power supply 40 may be electrically connected to the main board 50 to supply power to the electronic device 1. The main board 50 may be provided with a power supply management circuit. The power supply management circuit is configured to distribute a voltage provided by the power supply 40 to each electronic apparatus in the electronic device 1.

It can be understood that the above is only an exemplary example of the electronic device 1. The electronic device 1 in the embodiments of the present disclosure may also include components such as sensors, acoustic-electric conversion apparatus, antenna modules, and etc., which may refer to the description in related technologies, and are not repeated herein.

It should be noted that in the description of the present disclosure, the terms "first" and "second" are merely intended for a purposes of description, and shall not be understood as indicating or implying relative significance or implicitly indicating the quantity of indicated technical features. Therefore, features defined with "first" or "second" may explicitly or implicitly include one or more of the features. In the description of the present disclosure, the term "plurality" means at least two, unless otherwise specifically limited.

The anti-shake assembly, the camera module, and the electronic device provided by the embodiments of the present disclosure have been introduced in detail above. In the descriptions, examples are used to illustrate the principles and implementation methods of the present disclosure, and the descriptions of the embodiments above are merely used to help understand the present disclosure. For those skilled in the art, the implementation methods and application scope may be changed based on the idea of the present disclosure. In summary, the content of the specification should not be construed as limiting the present disclosure.

What is claimed is:

1. An anti-shake assembly, comprising:

a bearing plate, comprising a movable member and a fixed member arranged with an interval therebetween, wherein the movable member is configured to bear an image sensor of a camera module; and a driving mechanism, arranged at a side of the bearing plate, wherein the driving mechanism comprises a moving member and a plurality of deformable members, the moving member is connected to the movable member, an end of each of the deformable members is connected to the fixed member, another end of each of the deformable members is connected to the moving member, and the deformable members are configured to be deformed in a power-on state for driving the moving member, the movable member, and the image sensor to move;

wherein the bearing plate further comprises at least one elastic member and each of the at least one elastic member is arranged between the movable member and the fixed member and is connected to the movable member and the fixed member; and each of the at least one elastic member is configured to provide the movable member with an elastic force opposite to a movement direction of the movable member to restrain the movement of the movable member.

2. The anti-shake assembly according to claim 1, wherein the deformable members are configured to be deformed in the power-on state for driving the moving member, the movable member, and the image sensor to move along a direction perpendicular to an optical axis of a lens of the camera module or to rotate along a direction around the optical axis of the lens.

3. The anti-shake assembly according to claim 1, wherein the driving mechanism further comprises a plurality of movable ends and a plurality of fixed ends, the movable ends are arranged on the moving member, the fixed ends are arranged on the fixed member, the end of each of the deformable members is connected to a corresponding one of the fixed ends, and the another end of each of the deformable members is connected to a corresponding one of the movable ends.

4. The anti-shake assembly according to claim 3, wherein a driving circuit is arranged on the fixed member, and the driving circuit is electrically connected to at least one of the movable ends and the fixed ends, enabling the driving circuit to be electrically connected to the deformable members.

5. The anti-shake assembly according to claim 3, wherein the driving mechanism comprises two movable ends and two fixed ends, the two movable ends and the two fixed ends form a quadrilateral structure, the two movable ends are located on a diagonal of the quadrilateral structure, and the two fixed ends are located on another diagonal of the quadrilateral structure.

6. The anti-shake assembly according to claim 1, wherein the deformable members are arranged around the moving member.

7. The anti-shake assembly according to claim 6, wherein the moving member comprises a first portion, a second portion, a third portion, and a fourth portion, which are connected end to end, the first portion and the third portion are arranged oppositely, and the second portion and the fourth portion are arranged oppositely;

the deformable members comprise a first deformable member, a second deformable member, a third deformable member, and a fourth deformable member, the first deformable member is arranged opposite to the first portion, the second deformable member is arranged opposite to the second portion, the third deformable member is arranged opposite to the third portion, the fourth deformable member is arranged opposite to the fourth portion, and the first deformable member, the second deformable member, the third deformable member, and the fourth deformable member cooperate with each other for driving the moving member to move.

8. The anti-shake assembly according to claim 7, wherein the moving member further comprises a first extending portion and a second extending portion, the first extending portion is disposed between the first portion and the fourth portion, the second extending portion is disposed between the second portion and the third portion, and both the first extending portion and the second extending portion extend toward a direction away from the moving member;

wherein, both an end of the first deformable member and an end of the fourth deformable member are connected to the first extending portion, both another end of the first deformable member and another end of the fourth deformable member are connected to the fixed member, both an end of the second deformable member and an end of the third deformable member are connected to the second extending portion, and both another end of the third deformable member and another end of the second deformable member are connected to the fixed member.

9. The anti-shake assembly according to claim 1, wherein the deformable members are made of shape memory alloy materials.

10. The anti-shake assembly according to claim 1, wherein the bearing plate comprises more than one elastic member, a first end of each of the more than one elastic member is connected to the fixed member, a second end of each of the more than one elastic member is connected to the movable member, a projection of the first end projected on the movable member is staggered with a corresponding second end, and the more than one elastic member are arranged around a periphery of the movable member in sequence.

11. The anti-shake assembly according to claim 10, wherein in every two adjacent elastic members among the more than one elastic member, a second end of one elastic member is adjacent to a projection of a first end of another elastic member projected on the movable member, and the second end of the one elastic member and the projection of the first end of the another elastic member projected on the movable member are located at a same side of the movable member.

12. The anti-shake assembly according to claim 1, wherein the movable member comprises a first electrical connection end electrically connected to the image sensor, the fixed member comprises a second electrical connection end electrically connected to an external circuit, and each of the at least one elastic member is electrically connected to the second electrical connection end and the first electrical connection end, enabling the external circuit to be electrically connected to the image sensor.

13. A camera module, comprising:

a lens, configured to collect external light;

an image sensor, disposed opposite to the lens along a direction of an optical axis of the lens; and an anti-shake assembly, comprising a bearing plate and a driving mechanism, wherein the bearing plate comprises a movable member and a fixed member arranged with an interval therebetween, the movable member is configured to bear the image sensor of the camera module, the driving mechanism is arranged at a side of the bearing plate, the driving mechanism comprises a moving member and a plurality of deformable members, the moving member is connected to the movable member, an end of each of the deformable members is connected to the fixed member, another end of each of the deformable members is connected to the moving member, and the deformable members are configured to be deformed in a power-on state for driving the moving member, the movable member, and the image sensor to move;

wherein the bearing plate further comprises at least one elastic member, and each of the at least one elastic member is arranged between the movable member and the fixed member, and is connected to the movable member and the fixed member; and each of the at least one elastic member is configured to provide the movable member with an elastic force opposite to a movement direction of the movable member to restrain the movement of the movable member.

14. The camera module according to claim 13, further comprising:

a focus assembly, connected to the lens and configured for driving the lens to move.

15. The camera module according to claim 12, wherein the focus assembly comprises:

a magnetic member, configured to generate a magnetic field;

a bearing member, located in the magnetic field and connected to the lens; and a conductive member, arranged opposite to the magnetic member along a direction perpendicular to the optical axis of the lens, wherein the conductive member is configured to generate a force under an action of the magnetic member, and the force is configured for driving the bearing member to move along the direction of the optical axis of the lens.

16. The camera module according to claim 13, wherein the deformable members are enabled to be deformed in the power-on state for driving the moving member, the movable member, and the image sensor to move along a direction perpendicular to the optical axis of the lens or to rotate along a direction around of the optical axis of the lens.

17. The camera module according to claim 13, wherein the driving mechanism further comprises a plurality of movable ends and a plurality of fixed ends, the movable ends are arranged on the moving member, the fixed ends are arranged on the fixed member, the end of each of the deformable members is connected to a corresponding one of the fixed ends, and the another end of each of the deformable members is connected to a corresponding one of the movable ends.

18. An electronic device, comprising a shell and a camera module arranged in the shell, wherein the camera module comprises:

a lens, configured to collect external light;

an image sensor, disposed opposite to the lens along a direction of an optical axis of the lens; and an anti-shake assembly, comprising a bearing plate and a driving mechanism, wherein the bearing plate comprises a movable member and a fixed member arranged with an interval therebetween, the movable member is configured to bear the image sensor of the camera module, the driving mechanism is arranged at a side of the bearing plate, the driving mechanism comprises a moving member and a plurality of deformable members, the moving member is connected to the movable member, an end of each of the deformable members is connected to the fixed member, another end of each of the deformable members is connected to the moving member, and the deformable members are configured to be deformed in a power-on state for driving the moving member, the movable member, and the image sensor to move;

wherein the bearing plate further comprises at least one elastic member, and each of the at least one elastic member is arranged between the movable member and the fixed member, and is connected to the movable member and the fixed member; and each of the at least one elastic member is configured to provide the movable member with an elastic force opposite to a movement direction of the movable member to restrain the movement of the movable member.

* * * * *